UNITED STATES PATENT OFFICE.

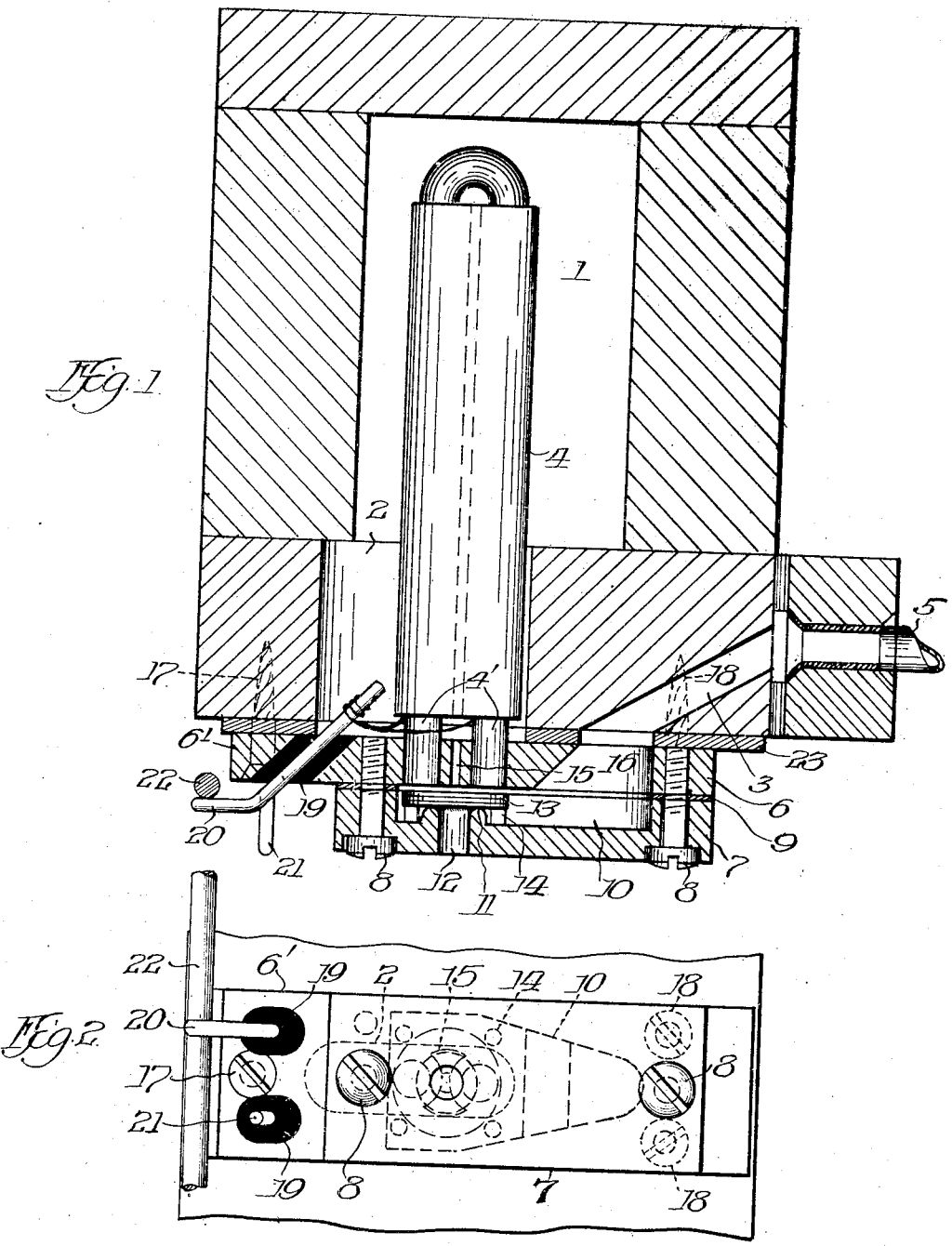

HALSEY G. KINDER, OF CHICAGO, ILLINOIS, ASSIGNOR TO THE WIDNEY COMPANY, OF CHICAGO, ILLINOIS, A CORPORATION OF ILLINOIS.

ELECTROPNEUMATIC ORGAN-VALVE.

1,239,698.    Specification of Letters Patent.    Patented Sept. 11, 1917.

Application filed December 20, 1916. Serial No. 137,837.

*To all whom it may concern:*

Be it known that I, HALSEY G. KINDER, a citizen of the United States, residing at Chicago, in the county of Cook and State of Illinois, have invented certain new and useful Improvements in Electropneumatic Organ-Valves, of which the following is a specification.

This invention relates to electropneumatic valves used in the construction of pipe organs, and has reference more particularly to an improvement in what are known as the primary valves that are employed to vent the channels or air passages controlling the secondary valves, which latter in turn, control the pipes of the organ.

These primary valves are commonly located on the lower side of the wind chest and carry not only the valve proper but also the electromagnet by which the valve proper is raised from its seat; this magnet extending upwardly into the wind chest.

Heretofore it has been customary to connect one end of the magnet winding to a wire extending through the wind chest and to lead the other end of the magnet winding through the joint between the bottom wall of the wind chest and a side wall thereof. This has made it necessary, in order to obtain access to any magnet of the series for disconnecting or connecting up the same, to remove the entire side wall of the wind chest. Furthermore, through shrinking and swelling of the walls of the wind chest, the magnet wire that passes through the joint between the bottom and side walls is sometimes strained or broken.

The main object of the present invention is to simplify the construction of these primary valves in such a manner as to render it possible to readily remove and replace any individual magnet and primary valve structure without involving any partial dismantling of the wind chest or disturbing the operative condition of the other magnets and valves of the series, and also to obviate any liability of injury to the magnet winding through climatic influences on the wind chest.

The means whereby, and the manner in which, this and other minor objects of the invention are attained will be readily understood by those acquainted with this art from a consideration of the following description when taken in connection with the accompanying drawing illustrating one practical embodiment of the invention, and wherein—

Figure 1 is a cross sectional view through a wind chest and primary valve, showing the magnet and valve proper in elevation;

Fig. 2 is a bottom plan view of the two-part valve-casing.

Referring to the drawing, 1 designates the wind chest of usual construction, the bottom wall of which is provided with ducts or passages 2 and 3, the former communicating at its upper end with the interior of the wind chest and adapted to accommodate a magnet 4, while the latter extends through the bottom of the wind chest and at its other end connects with a pipe 5 that leads to the power pneumatic of the secondary valve. The primary valve-casing comprises upper and lower sections, 6 and 7 respectively, that are united by screws 8 and an interposed thin washer 9 designed to insure an air tight joint between the sections. The lower section 7 contains a chamber 10, the outlines of which are indicated by a dotted line in Fig. 2, and within this chamber is an annular valve seat 11 surrounding the vent passage 12 through the bottom wall of the section 7. 13 designates the valve proper, this member taking the form of a metal disk that is guided in its rising and falling movements by guide pins 14 surrounding the periphery thereof. The cores 4' of the magnet 4 are permanently mounted in the upper section 6 of the valve-casing directly over the valve disk 13. The section 6 contains a substantially central port 15 extending vertically therethrough between the cores 4', and it also contains, to one side of the armatures, a port or passageway 16 connecting the chamber 10 of the lower section with the vent passage 3 in the base of the wind box.

The upper casing section 6 is formed with an extension 6' whereby it exceeds the length of the lower section 7, and the section 6 is detachably secured to the bottom wall of the wind chest by a screw 17 passing through the extension 6' and a pair of screws 18 passing through the other end of the section 6.

The extension 6' of the casing section 6 is formed with a pair of oblique transverse apertures containing insulation indicated at 19 for a pair of conducting rods or wires 20 and 21, to which the ends of the magnet wire are joined. The conductor 20 is adapted, when the valve is in place, to form an electrical connection with a wire or cable 22 that extends lengthwise of the wind chest and is connected to one side of any suitable generator. The other conductor 21 is wired to the other side of the generator through a key-controlled circuit-breaker. As these electrical connections are well understood in this art, they are not herein illustrated in detail.

The entire valve-casing, constructed and assembled as described, is secured to the bottom wall of the wind chest by the screws 17 and 18, a gasket 23 being preferably interposed to insure an air tight joint.

The operation will be readily understood by those skilled in the art. When the key of the instrument controlling any particular magnet and primary valve is depressed, a circuit is closed through the magnet, the valve 13 is raised, and the passage represented by the sections 12, 10, 16 3 and 5, is vented to the atmosphere, whereby the pneumatic which operates the secondary valve is actuated, causing the organ pipe to speak. As soon as the key of the instrument is released the circuit through the magnet is broken, the valve disk 13 drops to its seat, and wind chest pressure is restored through said vent passage.

When it may be necessary to examine or replace the valve 13, this can be done by simply withdrawing the screws 8 and the lower section 7 of the casing, leaving the upper section and the magnet in place. When it is desired or necessary to remove the magnet, the screws 17 and 18 are withdrawn and the upper section 6 with the magnet and its leads 20 and 21 may be withdrawn as a unit without involving any partial dismantling of the wind chest or any interference with the other valves of the series.

The specific structure of the valve-casing and valve herein described is obviously not essential to the main feature of the invention which consists in locating the connections for the magnet wire in the removable valve-casing itself, rather than in a wall of the wind chest, thereby making them removable with the magnet where the latter, as is usual, is mounted in or on the removable valve-casing.

I claim:

1. An electropneumatic organ valve, comprising a primary valve-casing adapted to be secured to the wind chest, an electromagnet carried by said casing, and connectors for the magnet wire mounted in said casing.

2. An electropneumatic organ valve, comprising a primary valve-casing consisting of an upper section adapted to be secured to the wind chest, a lower section secured to said upper section, an electromagnet mounted in said upper section, and connections for the wire of the magnet also mounted in said upper section.

3. An electropneumatic valve for organs, comprising a valve-casing consisting of separable upper and lower sections and means for uniting them, said upper section formed with an extension beyond one end of said lower section, an electromagnet mounted in said upper section, and connectors for the wire of the magnet mounted in the extension of said upper section.

HALSEY G. KINDER.